(12) United States Patent
Nordentoft (10) Patent No.: US 6,662,563 B1
(45) Date of Patent: Dec. 16, 2003

(54) COMPACT POWER GENERATION APPARATUS AND METHOD OF GENERATING ENERGY

(75) Inventor: Torsten Nordentoft, Varde (DK)

(73) Assignee: Norton ApS, Varde (DK)

( * ) Notice: Subject to any disclaimer, the term of this patent is extended or adjusted under 35 U.S.C. 154(b) by 0 days.

(21) Appl. No.: 09/980,362
(22) PCT Filed: May 17, 2000
(86) PCT No.: PCT/DK00/00267
§ 371 (c)(1),
(2), (4) Date: Nov. 30, 2001
(87) PCT Pub. No.: WO00/73640
PCT Pub. Date: Dec. 7, 2000

(30) Foreign Application Priority Data

May 31, 1999 (EP) .............................. 99201730

(51) Int. Cl.[7] ............................... F02G 3/00
(52) U.S. Cl. .......................... 60/616; 60/614
(58) Field of Search ....................... 60/614, 616; 123/2, 123/198 E (56) References Cited

U.S. PATENT DOCUMENTS

| | | | |
|---|---|---|---|
| 1,887,633 A | * 11/1932 | Geiger ........................ | 60/616 |
| 4,608,946 A | 9/1986 | Tanaka et al. | |
| 4,835,405 A | 5/1989 | Clancey et al. | |
| 4,924,826 A | * 5/1990 | Vinson .................... | 123/195 C |
| 5,014,660 A | 5/1991 | Westerbeke, Jr. | |
| 5,297,517 A | * 3/1994 | Brandt et al. ........... | 123/198 E |
| 5,433,175 A | 7/1995 | Hughes et al. | |
| 5,617,504 A | 4/1997 | Sciacca et al. | |
| 5,890,460 A | 4/1999 | Ball et al. | |
| 6,230,667 B1 | * 5/2001 | Stauffer et al. ................. | 123/2 |
| 6,305,170 B1 | * 10/2001 | Kitani et al. .............. | 60/616 X |

FOREIGN PATENT DOCUMENTS

| | | |
|---|---|---|
| DE | 35 11 123 | 2/1986 |
| DE | 298 12 982 | 12/1998 |
| EP | 0 268 726 | 6/1988 |
| GB | 2 213 201 | 8/1989 |
| JP | 3-267555 | 11/1991 |

* cited by examiner

Primary Examiner—Hoang Nguyen
(74) Attorney, Agent, or Firm—Merchant & Gould P.C.

(57) ABSTRACT

The present invention relates to a compact power generation apparatus for the generation of energy for powering various appliances, such as domestic appliances, comprising a housing accommodating an air cooled internal combustion engine, generator driven by the engine for the generation of electrical power, an exhaust system, an inlet communicating with an outlet and flow generating means for circulating a cooling air flow through and around the generator, the engine and the exhaust, wherein heat exchanging means are provided for extracting heat from the exhaust system and from the circulating air flow and passing said extracted heat on to a utility medium, such as air or water for utility purposes. Moreover, the invention relates to a method of generating energy, a method of automated power management of a compact power generation apparatus, and a power management system for carrying out this method.

29 Claims, 9 Drawing Sheets

COMPACT POWER GENERATION APPARATUS AND METHOD OF GENERATING ENERGY

The present invention relates to a compact power generation apparatus according to the preamble of claim 1. The invention further relates to a method of generating energy, a method of automated power management of a compact power generation apparatus, and a power management system for carrying out this method.

Small generators and accessories such as small heaters and battery chargers are products which are used in a wide field of applications. Such type of small generator can be used for powering a heater and other electrical appliances in e.g. trucks, leisure boats, mobile homes, caravans, for military purposes, in crises zones and other areas where normal electrical power and heat sources are not available, The generator is driven by an internal combustion engine for the generation of electrical power. This power can be used for powering various electrical devices, such as electrical heaters, lights, pumps, etc. and air conditioning installations.

The combustion engine in the generator can be air cooled, such as e.g. known from GB-A-2 213 201, U.S. Pat. No. 4,835,405, U.S. Pat. No. 4,608,946 or DE-A1-35 11 123. A constant flow of air is generated around the engine and the generator in order to remove the surplus heat, preventing the engine and the generator from overheating. The flow passages of the cooling air are designed in such a way that the noise from the engine is reduced. Also a silencer such in the exhaust is installed, and a protective, soundproof cover is fitted around the unit, in order to reduce the noise emission from the generator unit. Most devices are controlled by regulating the revolutions per minute of the engine and thus the frequency of the output. A small fuel tank is installed allowing for a few hours of operation. An exhaust silencer is fitted for noise reduction purposes.

For the provision of heat, heaters are known that consist of a hot chamber in which the fuel is consumed and a fin provides air for the combustion. A small fuel pump which is controlled by basic control electronics control the amount of fuel. The associated control panel is typically a timing device, which will allow a timed start and stop.

Battery chargers normally consist of a transformer which is designed such that when a certain charging voltage has been reached, the current will be close to zero and thus providing a simple charging mechanism. Unfortunately, the point where a battery is considered fully charged varies considerably with the temperature and rarely the batteries are charged properly causing a substantial wear on the batteries and a low life time.

In boats, trucks, mobile homes etc. the increasing power consumption due to the increase in the amount of equipment such as micro wave ovens, heaters, television, etc. require large battery capacity and large battery chargers in order to provide adequate battery charging when power is available.

In trucks for example, the need for battery charging, air conditioning and heating, when the main engine is not running, is real. The heating can be solved by using a small diesel powered heater which consumes considerable DC power when in use and thus increases the need for battery charging even more. Air conditioning is only possible to have while the main engine is running and truck drivers must tolerate ambient temperatures when resting.

From e.g. U.S. Pat. No. 5,433,175 an engine generator is known where a water cooled diesel engine for driving the generator. The use of water as coolant provides an efficient cooling in a compact system, just as the water cooling system in addition provides a noise reducing effect. Other water cooled diesel solutions are also known in particular for maritime purposes, that exhibits an excellent noise reduction and thus an extremely silent and compact generator.

However, these water cooled generators generally have a low efficiency. Moreover, a water cooling system is quite heavy as water connections, flow channels and air coolers must be present. This makes the water cooled generators both heavy and somewhat bulky and thus less suitable for purposes where frequent transportation is needed.

The low efficiency is a rather generic problem by an engine as well as by a generator. In the conversion from one energy source to another, energy is lost. In the engine where the fuel is combusted, in the transmission between the engine and the generator and in the conversion of mechanical energy into electrical power in the generator. Insufficient cooling and poor air supply and circulation into and around the engine are also factors contributing to a poor overall performance of a power generation apparatus. However, the reduction of the noise emission of the small generator usually causes some amount of decrease in efficiency of the power output, although many solutions attempts to minimise this efficiency decrease.

The efficiency is also decreased in the subsequently connected electrical appliances, and current small diesel powered generators only convert 20–30% of the total available power into electrical power. The remaining energy in the form of heat is wasted.

The object of the present invention is to provide a solution to these above identified problems and other problems associated with the prior art solutions and to provide a compact power generation apparatus. It is a further object of the invention to provide a method of generating energy and managing the power generation in a compact power generation apparatus.

This object is achieved by a compact power generation apparatus of the initially mentioned kind, wherein heat exchanging means are provided for extracting heat from the exhaust system and from the circulating air flow and passing said extracted heat on to a utility medium, such as air or water for utility purposes.

By the present invention a compact power generation apparatus is provided that can produce several types of energy outputs for the consumption in e.g. cabins of trucks, boats and recreation vehicles. By producing both electrical and heat energy for the consumption, the electrical energy need not be converted further in order to produce heat. This means that the efficiency in the production of heat is improved compared to the generator-sets known in the art. The heat energy that previously was considered a waste produce, can now be recovered and used for e.g. heating purposes, such as hot water or hot air. By cooling the exhaust air, the air volume is reduced and thus the noise level is reduced.

By making use of the available energy, including the normally wasted heat, the efficiency of a compact power generation apparatus according to the invention can be increased immensely.

In the preferred embodiment of a compact power generation apparatus according to the invention, the flow generating means involves means for generating an air flow through the generator, the engine and/or the heat exchanging means. This ensures a sufficient amount of air supply for the engine to run smoothly and a good cooling effect.

In the preferred embodiment the housing is provided with an inner and an outer chamber, said chambers being connected by a spacing divided into channels, said inner chamber accommodating the engine, generator and heat exchanging means. The channels between the inner and outer chamber can moreover be covered in sound absorbing material. Hereby a good cooling air circulation is provided that also provides a noise reduction of the power generation apparatus.

The inner chamber is in a preferred embodiment diverted into a number of channels, in which the cooling air can circulate by the assistance of a first and second fan that are provided in the inner chamber, in such a way that the inner chamber exhibits a cool section between the two fans and a hot section after the second fan. Hereby an efficient cooling is provided by the circulating air. By providing a slight over pressure in the cold section where the air intake is located, a super charging effect can be provided for the engine.

In the preferred embodiment, the first fan is a fly wheel mounted on the shaft of the generator forcing air through and around the generator. The second fan is preferably mounted by the air intake of the engine, preferably as a part of the fly wheel of the engine, and the first and second fan are so dimensioned that an relative higher pressure than the ambient pressure is present in the cold section. This solution provides an satisfactory air circulation in a simple manner.

The heat exchanging means in a power generation apparatus according to the invention comprises in the preferred embodiment of the invention, a first heat exchanger and second heat exchanger, the first heat exchanger extracting the heat from the exhaust system and heating the circulating cooling air, and the second heat exchanger separating the heat from the hot circulating air, and fresh air. The first heat exchanger could preferably be an exhaust silencer, possibly in a design where a substantial flow resistance in the exhaust is present in such a way that the design is suitable for extracting the heat from the exhaust. By the two heat exchangers the heat can safely be extracted from both the exhaust and the hot utility air, i.e. both the air that flows through and around the engine and the generator. By collecting the heat in the hot utility air and extracting it therefrom in the second heat exchanger that is an air to air and/or water heat exchanger. The second heat exchanger can also be provided with means for water heating and comprises an auxiliary electrical heat element and a fan. This means that the power generation apparatus according to this embodiment of the invention can also provide hot air or hot water, since the second heat exchanger can be powered by electricity.

In the preferred embodiment the power generation apparatus includes battery charging means. The battery or batteries can be charged when the engine is running. This charging can be controlled automatically according to the load on the engine and the present demand for power at the power outputs of the power generation apparatuses, and the actual need for charging.

The internal combustion engine is in the preferred embodiment a diesel engine, but it is realised that other combustion engines, such as a petrol- or gas-driven engine or a gas turbine could be used alternatively.

In a second aspect of the invention the invention comprises a method of generating energy in a compact power generation apparatus, said method comprising the steps of combusting a fuel, such as diesel oil, petrol, gas or the like, from a fuel source in an internal combustion engine, converting the potential energy of the fuel into mechanical power is generated together with the generation of heat, converting said mechanical power into electrical power in a generator, and into an air flow through an air inlet and through and around the generator and the engine, absorbing the heat generated by the combustion in the engine and the generator in at least a part of the air flow, and extracting the heat in heat exchanging means and passing said heat on to a utility medium, such as air or water for utility purposes.

A method according to this aspect of the invention, enables the extraction of several sources of energy from a compact power generation apparatus in a consumable form, this means that the overall efficiency is increased, and that a compact power generation apparatus making use of this method becomes self-contained, as no external units must be connected to the generator in order to secure the supply of energy needed on the site.

In the preferred embodiment of the invention the at least one battery, such as a utility and/or a start battery is charged by the electrical power generated by the generator.

The electrical power generated by the generator is in a preferred embodiment converted into a utility AC voltage, such as 220/115 V AC, so that the power generation apparatus can substitute a normal power connected to the net of a household appliance, such as a coffee machine, a micro wave oven, etc. Preferably two further electric power outputs are present, providing 12/24 VDC 60/30 Amp for utility battery charging, and 12/24 VDC 10/5 Amp for start battery charging.

According to a method according to the invention, air conditioning can also carried out by electrically powered air conditioning means. This means that the temperature in a cabin or the like where the power generation apparatus is placed, can be controlled. A thermostat could also be connected to the control system of the power generation apparatus, making it possible to control the room temperature by altering between the use of an air conditioner and the air to air heat exchanging means. The heat exchange is done in two stages, such as described above: a first heat exchange is carried out extracting heat from the exhaust system and absorbing said heat in the air flow, and a second heat exchange is carried out extracting heat from the air flow and passing the heat on to the utility medium.

In a further aspect of the present invention a power management system and a method of automated power management of a compact power generation apparatus, such as a power generation apparatus and a method according to the previous described aspects. The method of automated power management comprises the steps of sensing the load on the engine, registering the demand for electrical and mechanical power, and feeding these measurements to a power management means involving computer means connected to regulation means, and regulating the power generation and distributing said available power according to the registered need for electrical power and mechanical power, respectively.

Hereby the power generation apparatus can be operated automatically facilitating the operation of the power generation apparatus.

According to a preferred embodiment of said method, the registration of the power demand includes registering the capacity of the at least one battery, and that available power is regulated according to the demand for electrical and mechanical power.

The power management can automatically and start and stop the engine according to present demands.

The invention further comprises a power management system for carrying out the method according to the third aspect of the present invention, where said system comprises sensor means for measuring the performance and/or characteristics of one or more energy conversion elements of the power generation apparatus, registration means for determining the presently required output of electrical and mechanical power from the power generation apparatus, and computer means for controlling one or more regulation means of the energy conversion means for adapting the kinds of generated power of the power generation apparatus according to the actual demands.

According to a preferred embodiment, the present power load on the generator is sensed, and that the power management according to the available power is determined according to a program containing a predetermined set of priorities. The power distribution can hereby be governed by a software in the computer. This software can be designed according to the area of operation, such as the climate, etc. that the miniature power generation apparatus is intended for.

The computer means preferably comprises a user interface for monitoring the power management and for entering user specified operation characteristics in the power management. Hereby it is possible to monitor the condition of the system, e.g. if a component is worn.

The power management system involves both electrical and heat power management, sensing the temperatures of the heat exchanging means and the air inlet of the power generation apparatus.

The invention is in the following described in more detail with reference to a specific embodiment of the invention and with reference to the accompanying drawings on which

With reference to FIGS. 1 to 5 a miniature automated power generation is shown. The apparatus comprises an inner chamber and an outer chamber. The inner chamber contains an internal combustion engine 12, a generator 17, an auxiliary fuel tank 13 and a first heat exchanger 5, 15. This first heat exchanger 5, 15 is a special exhaust silencer cooling the exhaust air from the engine 12 by the extracting the heat from the exhaust and passing it onto a circulating air flow in the inner chamber. The cooling reduces the air volume of the exhaust air and thus the noise level.

The inner chamber is built on a base platform comprising a base plate 10 of metal and an oil sump 11. Onto said base plate 10 the vibration and noise generating components are mounted. The weight of the base plate 10 is such that it acts as a counter weight to the vibrating parts. The base plate 10 under the engine is hollow and contains part of the oil sump 11, this feature allows long engine operation between oil change and provides continuos lubrication during tilt up to and in excess of 30 degrees, both in pitch and roll. This base plate 10 is mounted on a frame 1 which in turn is based on a vibration reducing mat 2. This mat is placed inside the outer chamber base plate 4 and thus provides vibration isolation between the inner and outer chamber.

The noise and vibration generating components are all arranged in the inner chamber, including the air intake and the drive transmission belt (not shown) between the engine 12 and the generator 17 that are arranged next to and parallel to each other. To the rear end of the generator shaft is mounted the primary fan 16. The primary fan air intake 18 is through a channel which is formed in the inner chamber wall 14 and the outer chamber wall 3 (not shown in FIGS. 2–5 for illustrative purposes). This channel is coated with a noise reducing foam or similar coating, so that a noise isolation between the inner chamber and the outside is provided.

The air from the primary fan 16 is forced through and around the generator 17, past the belt drive and up to the second fan 9 mounted on the engine 12. The space between the two fans 9, 16 is the cold section of the inner chamber and in which an over pressure in relation to the outside atmospheric pressure is present due to the design characteristics of the fans 9, 16. The air intake of the engine 12 is located in this area and the engine is thereby provided with a super charging effect improving the performance of the engine 12. The generator 17 has an internal fan which provides internal ventilation. The second fan 9 is also the fly wheel to which an electric starter motor is attached. The over pressure in the cold section helps the second fan to force the air through the engine 12. The heated air from the engine 12 is then forced through the primary heat exchanger or heat recovery unit 5. The exhaust from the engine 12 is also forced through the primary heat exchanger 5 whereby the heat from the exhaust is recovered. the hot air after the primary heat exchanger 5 is passed through a channel which is formed between the inner chamber 7 and the outer chamber 3. This channel is coated with a noise reducing foam and thus provide noise isolation between the inner chamber and the outside.

Externally mounted on the outer chamber 3 is the secondary heat exchanger 6. The second heat exchanger 6 is an air to air and air to water exchanger, see FIG. 6. It comprises a hot air inlet 19 receiving the hot air from the first heat exchanger 5, an air outlet 22 for the air output for the air from the first heat exchanger 5, an air outlet 23 for heated fresh air, a water inlet 24 for cold water and a water outlet 25 for hot water. Moreover, the second heat exchanger 6 also comprises an electric fan 21 and an electric heat element 20. The electric fan provides fresh air flow through the second heat exchanger 6. This air can be used for heating. The electric heat element is used by the computer 15 of the power management system to provide a load on the engine and thus increase heat generation when no other load or insufficient load compared with the demand is present.

A small internal fuel tank 13 such as a tank containing 200 ml fuel is mounted on the side of the engine 12. This is to prevent air in the fuel system when connecting an disconnecting the power plant (or MAPS: Miniature Automated Power System) from fixed installations. It also provides emergency start and limited operation capability in case of total power failure.

Figure 7:
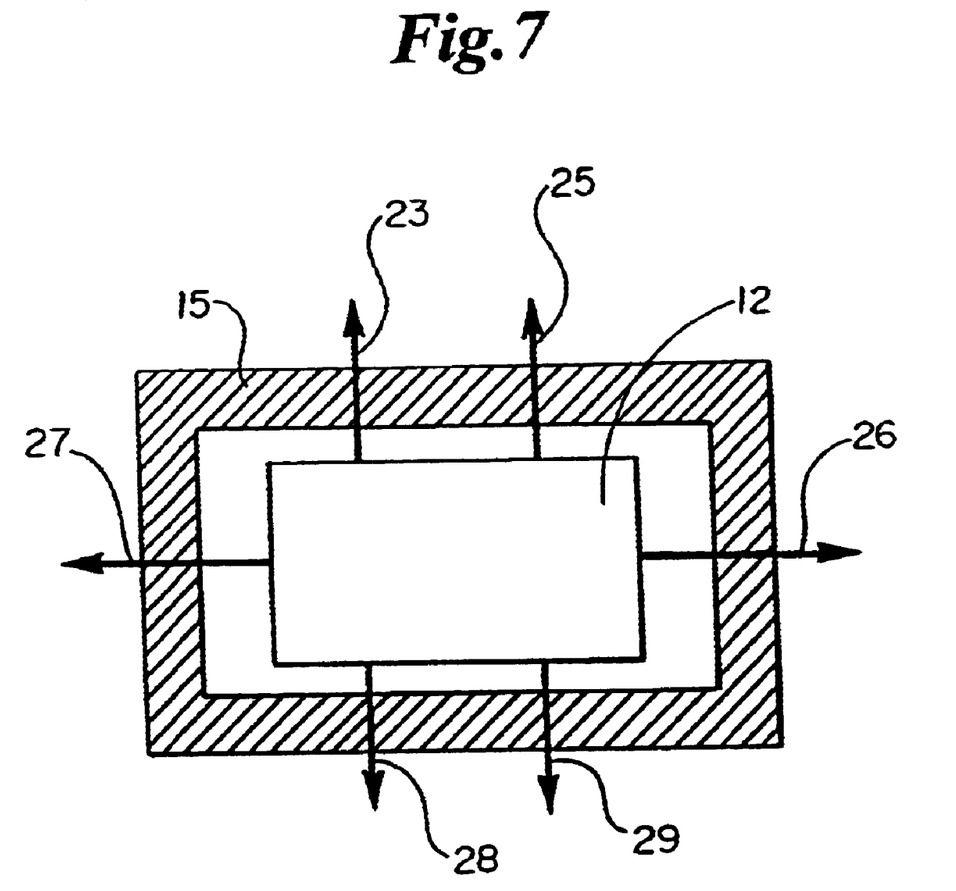
FIG. 7 is a schematic diagram of the power management system according to the invention.

The central control computer 15 is located together with other electronics in a none vibration enclosure which is attached to the outer chamber 3. The computer provides automated start and stop of the MAPS and distributes the total available power according to a set of rules in the software. FIG. 7 shows schematically the various power output from the energy source 12 that are managed by the control computer 15. These power output are: hot air 23 and hot water 25, AC power output 27, preferably 220 V AC 2200 W per demand, an air conditioner 26, temperature compensated utility battery charging 28 and temperature compensated start battery charging 29. It also provides service management and failure identification. The load on the A/C power output is monitored and if a load is present, the computer initiates a start sequence. The fuel pump of the engine is activated, a servo motor drives a stop lever to an operate position and the starter motor is engaged. The A/C power output from the generator 17 is monitored. When the generator reaches 40% below normal RPM it starts generating current and when this is sensed by the computer, the starter motor is disengaged.

If nothing is sensed after a pre-determined period of time, the starter motor is also disengaged. After a certain time period, preferably defined in the software e.g. one minute, another start is attempted this will continue to either a start is successful or a certain number of attempts have been made, said number preferably being defined in the management software, e.g. five attempts. If unsuccessful, a service lamp on the control panel will light and a failure code indicating the type of failure will be displayed on the display.

A number of causes can initiate a start sequence: a) A/C power load, b) low voltage on either battery charging circuits, c) manual start request, d) heat request, e) air conditioning request. The battery charging circuits are divided into two separate systems, a 12 Volt/60 Amp or 24 Volt/30 amp, and a 12 Volt/10 amp or 24 volt/5 amp circuit.

Each circuit has separated sensing means located at each set of batteries, that will sense the temperature and voltage. Using this information the computer will initiate a start sequence when the batteries are considered discharged and provide automated battery charging according to a dynamic charging profile. This provides optimum charging and reduces the charging time.

The load management is done by measuring the total load on the generator. If the load increases beyond the allowable maximum, loads will be disconnected according to a set of rules in the software, where the air conditioning has lowest priority and the battery charging has the highest.

Figure 1:
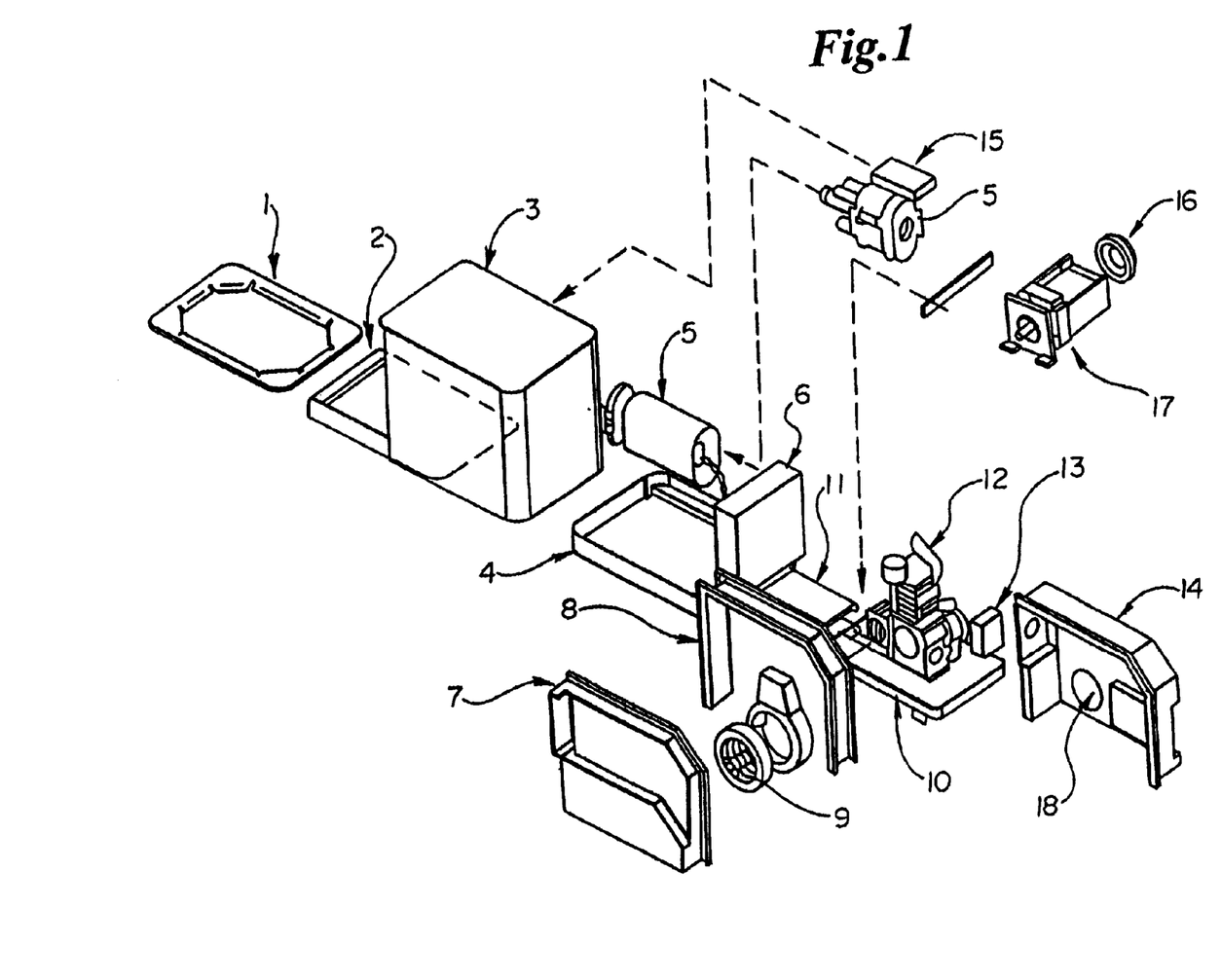
FIG. 1 is an exploded view of a power generation apparatus according to a preferred embodiment of the invention.
Figure 2:
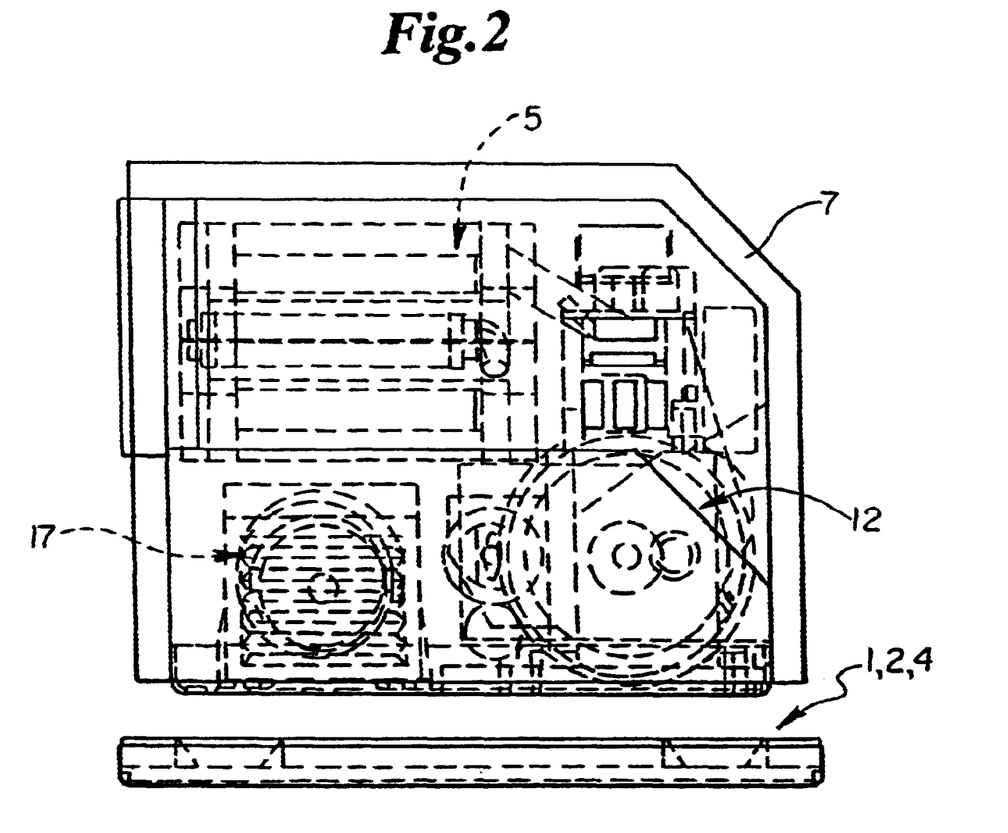
FIG. 2 is a side view of the inner chamber of the power generation apparatus.
Figure 3:
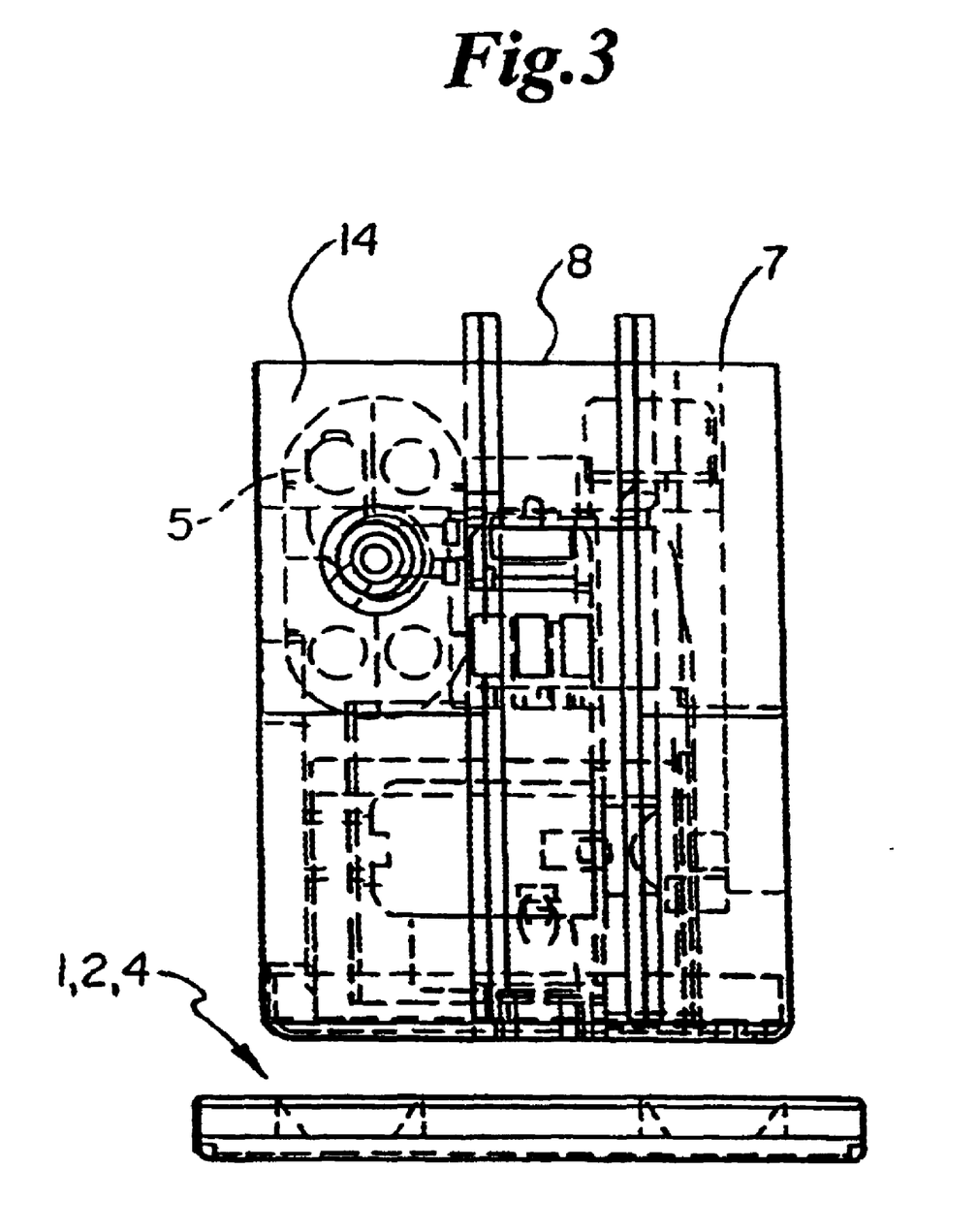
FIG. 3 is an end view thereof.
Figure 4:
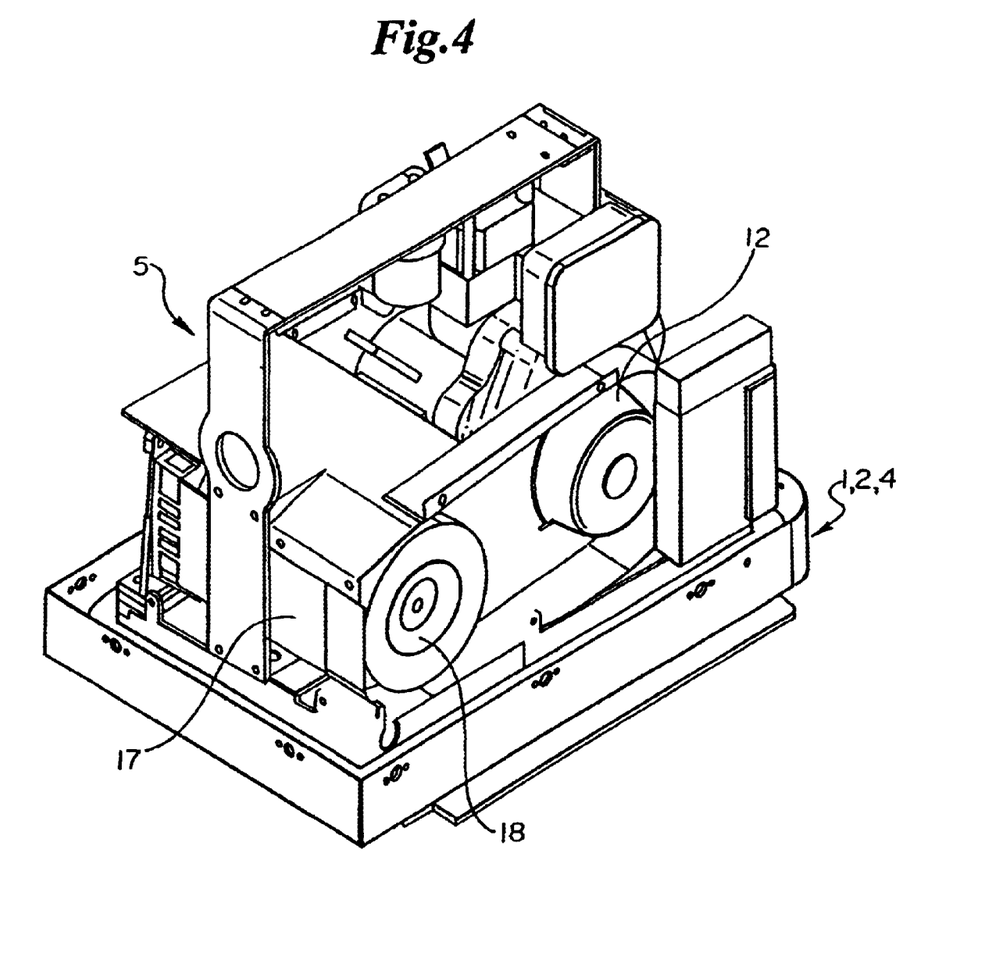
FIG. 4 is a perspective view of the inner chamber of the power generation apparatus.
Figure 5:
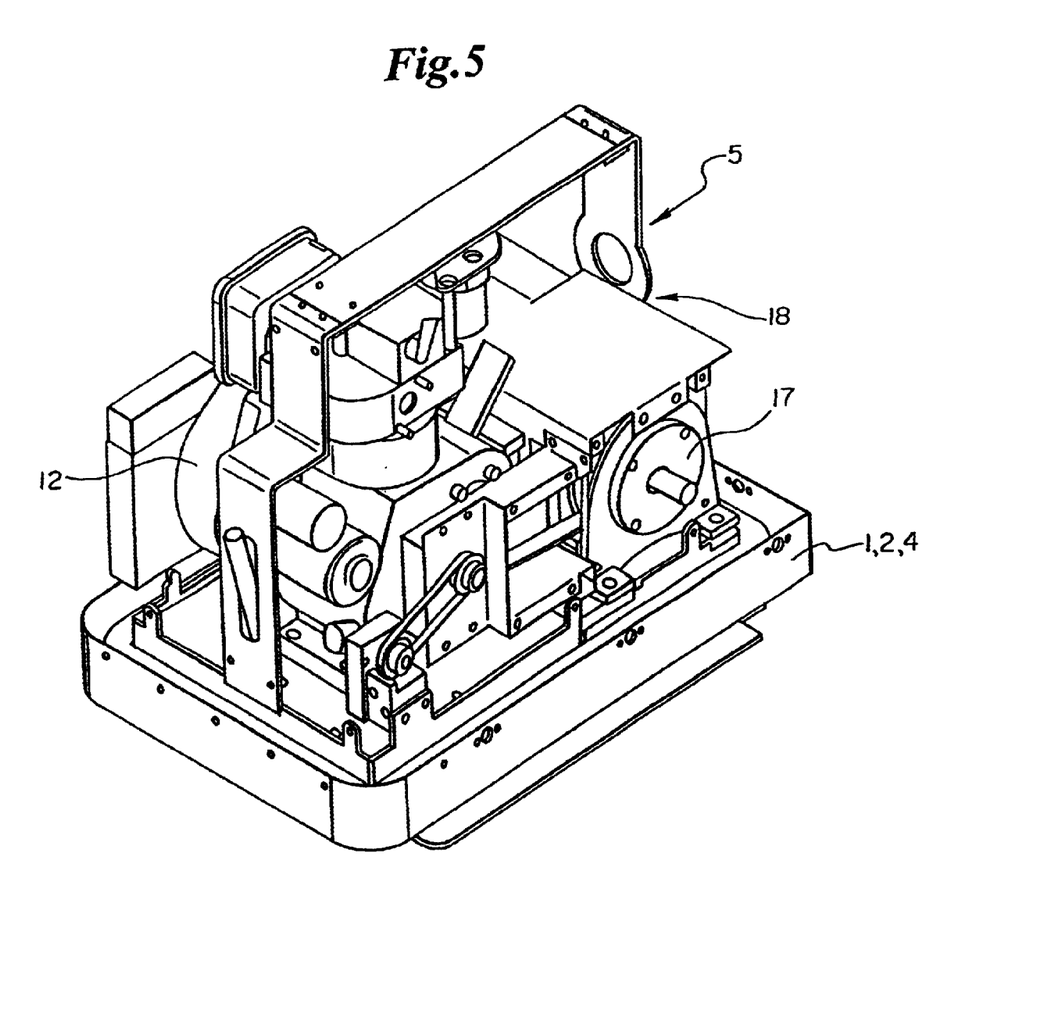
FIG. 5 is the same viewed from the other end.
Figure 6:
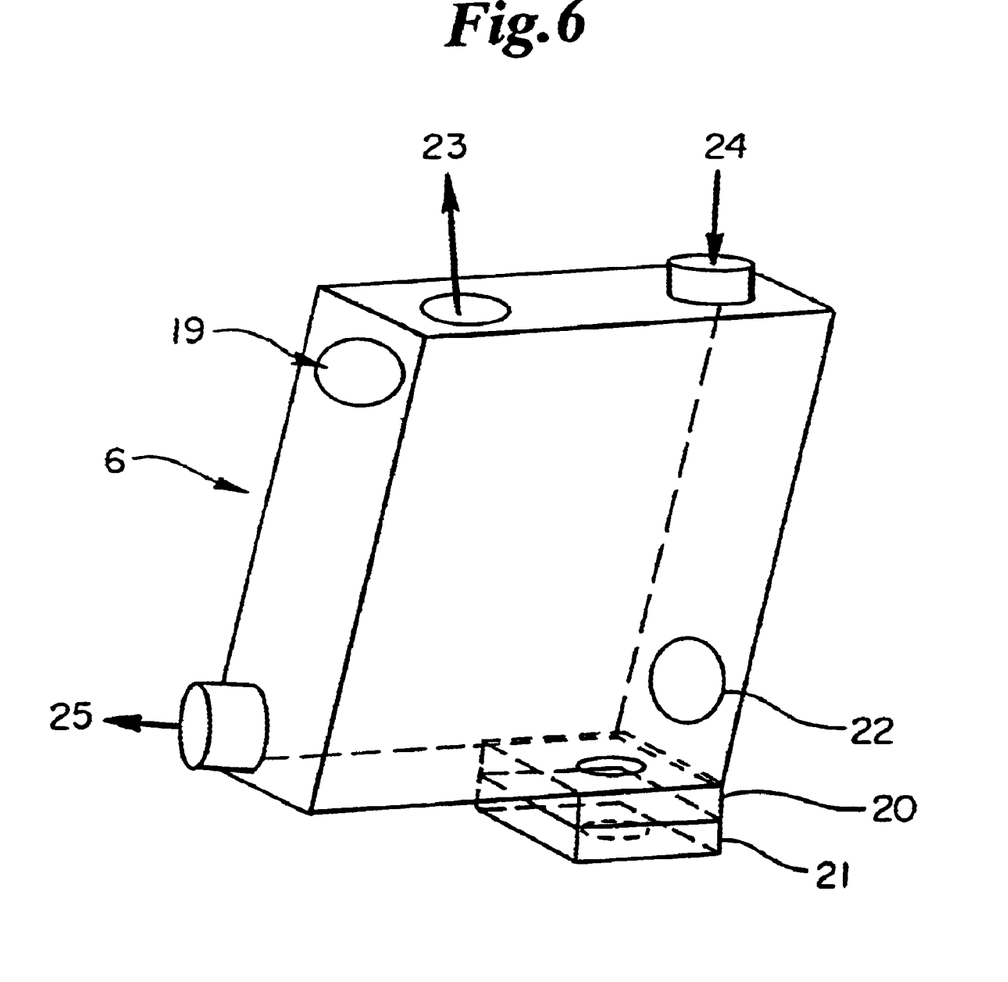
FIG. 6 is a schematic view of the second heat exchanger.

If heat is requested and no load or insufficient load is present, the computer will provide load to the engine by using the heat element 21 in the second heat exchanger 6. This load is dynamically controlled and determined by the amount of heat requested and the load present by other requirements, such as battery charging.

When there is no heat or air conditioning requirement, load on the A/C power or battery charging circuits, the engine will shut down unless a power management becomes valid within a predetermined time period, e.g. determined in the MAPS software, e.g. three minutes.

Figure 8:
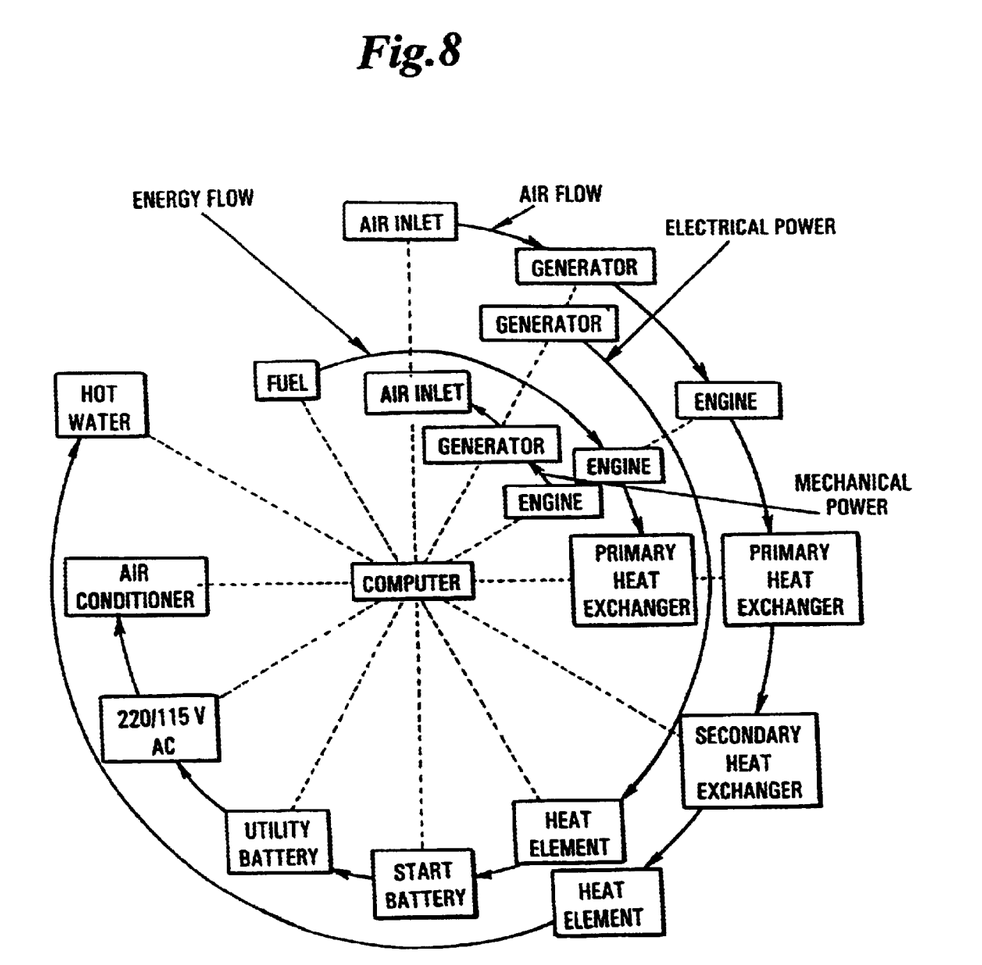
FIG. 8 is a schematic illustration of the energy flow in a power generation apparatus according to a preferred embodiment of the invention.

In FIG. 8, the energy flow by a MAPS according to the invention and the division into different types of energy is illustrated. A portable miniature, silent, automated power plant according to the preferred embodiment of the invention provides from 100% energy, 70% utility heat, 10% waste heat and 20% mechanical movement. The mechanical movement is used to drive the generator.

As displayed in the graphic circuit "Energy Flow" fuel is combusted in the engine that hereby produces heat in the exhaust system. The engine further drives the generator, as shown in the "mechanical Power" graphic circuit. The generator drives a fan of the air intake, initiating the "Air Flow" energy circuit. The generator also produces electrical power, as indicated by the "Electrical Power" graphic display.

The "Air Flow" provides cooling to the generator and air for the engine. The air flows through the primary heat exchanger where the surplus heat from the exhaust is collected in the air flow, that then continues through the secondary heat exchanger and over the electrically driven heat element, that can apply further meat according to the demand for hot water or hot air.

The heat element is driven by the electric power generated in the generator, as shown by the "Electric Power" flow. The electric power is also distributed to the start battery, the utility battery, the AC power output and to the air conditioner.

Figure 9:
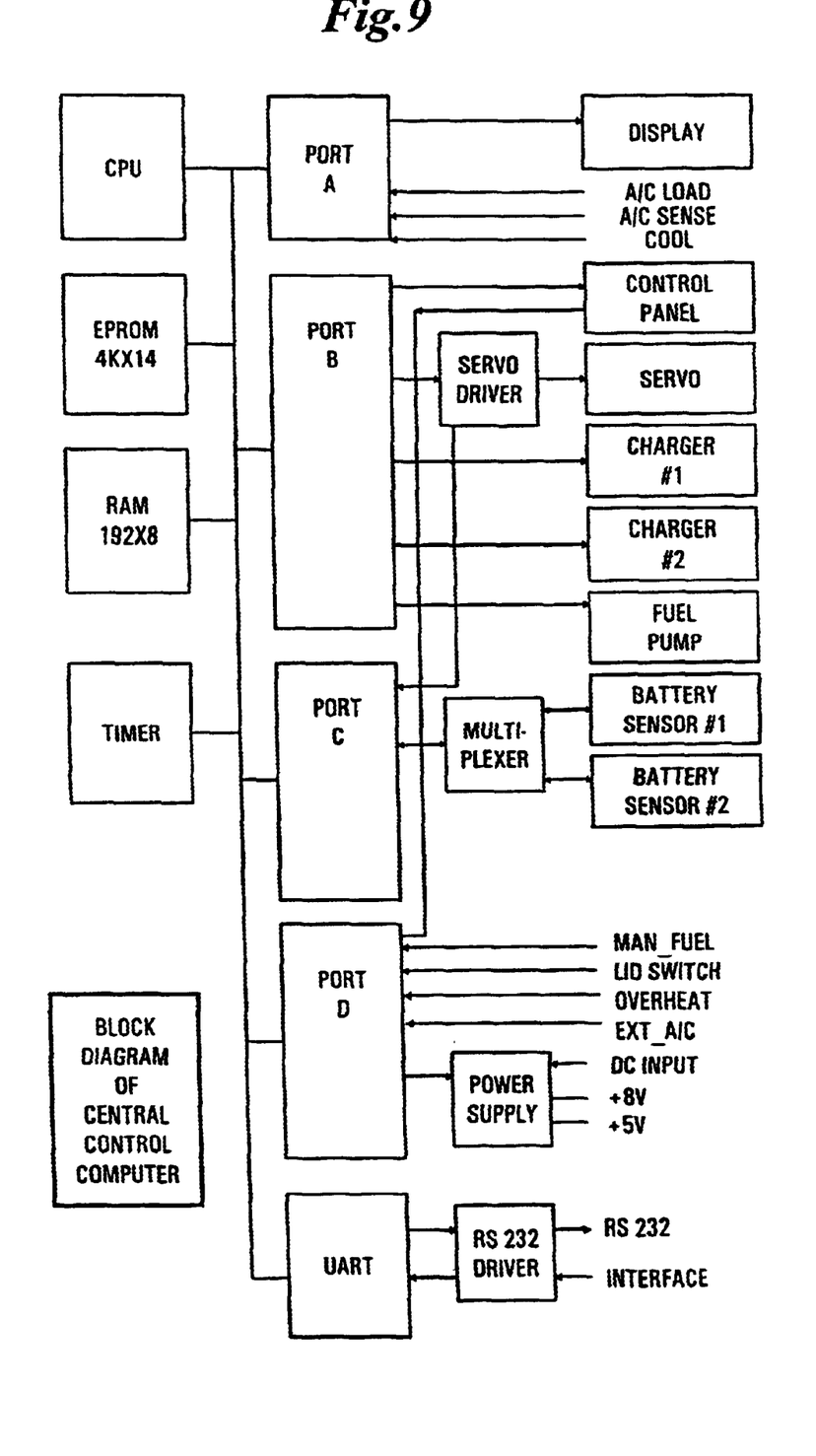
FIG. 9 is a block diagram of the central control computer of the power management system according to a preferred embodiment of the invention.

All the energy consuming and energy generating components are managed by the central control computer. In FIG. 9 a block diagram of the preferred design of the central computer is shown. The computer is provided with a display for monitoring the status of the power management, conditions and possible failures of individual components. Associated with the display a control panel is present for manual input of control data.

What is claimed is:

1. A mobile compact power generation apparatus, mountable on a vehicle, for generation of energy for powering appliances in mobile facilities, comprising:

a housing accommodating an air cooled internal combustion engine and including an exhaust system;

a generator driven by the engine for generation of electrical power;

an inlet communicating with an outlet and flow generating means for circulating a cooling air flow through and around the generator, the engine and the exhaust system;

heat exchanging means adapted to extracting heat from the exhaust system and from the circulating air flow and passing said extracted heat on to a utility medium; and a power management system sensing a load on the engine in order to distribute power according to actual demands for electrical power or heat in the mobile facilities.

2. A mobile compact power generation apparatus according to claim 1, wherein the flow generating means includes means for generating an air flow through the generator, the engine and the heat exchanging means.

3. A mobile compact power generation apparatus according to claim 1, wherein the housing is provided with an inner and an outer chamber, said chambers being connected by a spacing divided into channels, said inner chamber accommodating the engine, generator and beat exchanging means.

4. A mobile compact power generation apparatus according to claim 3, wherein said channels between the inner and outer chamber are covered in sound absorbing material.

5. A mobile compact power generation apparatus according to claim 3, wherein the inner chamber is divided into a number of channels, in which the cooling air can be circulated by first and second fans that are provided in the inner chamber, in such a way that the inner chamber exhibits a cool section between the two fans and a hot section after the second fan.

6. A mobile compact power generation apparatus according to claim 5, wherein the first fan is a fly wheel mounted on a shaft of the generator forcing air through and around the generator.

7. A mobile compact power generation apparatus according to claim 5, wherein the second fan is mounted by an air intake of the engine.

8. A mobile compact power generation apparatus according to claim 7, wherein the first and second fans are so dimensioned that a relative higher pressure than ambient pressure is present in the cool section.

9. A mobile compact power generation apparatus according to claim 1, wherein the heat exchanging means comprises a first heat exchanger and second heat exchanger, the first heat exchanger extracting the heat from the exhaust system and heating the circulating cooling air, and the second heat exchanger separating the heat from hot circulating air and fresh air.

10. A mobile compact power generation apparatus according to claim 9, wherein the first beat exchanger is an exhaust silencer.

11. A mobile compact power generation apparatus according to claim 9, wherein the second heat exchanger is provided with means for water heating and comprises an auxiliary electrical heat element and a fan.

12. A mobile compact power generation apparatus according to claim 1, wherein the power generation apparatus includes battery charging means.

13. A method of generating energy in a vehicle with a mobile compact power generation apparatus, comprising the steps of:
    combusting a fuel from a fuel source in an air cooled internal combustion engine,
    converting potential energy of the fuel into mechanical power, along with generation of heat,
    converting said mechanical power into electrical power in a generator, and into an air flow through an air inlet and through and around the generator and the engine,
    absorbing the heat generated by the combustion in the engine and the generator in at least a part of the air flow, and
    extracting the heat in heat exchanging means and passing said heat on to a utility medium for utility purposes.

14. A mobile compact power generation apparatus according to claim 1, wherein the internal combustion engine is a diesel engine.

15. A method of automated power management of a mobile compact power generation apparatus by carrying out the following steps:
    sensing a load on an air cooled internal combustion engine,
    registering demand for electrical and mechanical power in power-consuming facilities in a vehicle,
    feeding these measurements to a power management system including computer means connected to regulation means, and
    regulating power generation and distributing available power according to the registered demand for electrical power and mechanical power, respectively.

16. A power management system carrying out a method of automated power management of a mobile compact power generation apparatus generating predetermined sources of utility energy in a vehicle, the mobile compact power generation apparatus having an air cooled internal combustion engine, said power management system comprising:
    sensor means for measuring at least one characteristic of at least one energy conversions element of the power generation apparatus,
    registration means for determining a presently required output of electrical and mechanical power from the power generation apparatus, and
    computer means for controlling at least one regulation means of the energy conversion element for adapting generated power of the power generation apparatus according to actual demands.

17. A power management system according to claim 16, wherein the power management system performs both electrical and heat power management, sensing temperatures of a heat exchanging means and an air inlet of the power generation apparatus.

18. A power management system according to claim 16, wherein the computer means comprises a user interface for monitoring the power management apparatus and for entering user specified operation characteristics in the power management apparatus.

19. A mobile compact power generation apparatus according to claim 1, wherein the utility medium is air for utility purposes.

20. A mobile compact power generation apparatus according to claim 1, wherein the utility medium is water for utility purposes.

21. A method according to claim 13, wherein at least one battery is charged by the electrical power generated by the generator.

22. A method according to claim 13, wherein the air flow is heated by an electric heat element.

23. A method according to claim 13, wherein the electrical power generated by the generator is converted into a utility AC voltage.

24. A method according to claim 13, wherein air conditioning is provided by an electrically powered air conditioning means.

25. A method according to 13, wherein a first heat exchange is carried out extracting heat from the exhaust system and absorbing said heat in the air flow, and a second heat exchange is carried out extracting heat from the air flow and passing the heat on to the utility medium.

26. A mobile compact power generation apparatus mountable on a vehicle for the generation of energy for powering appliances in mobile facilities, comprising:
    a housing accommodating an air cooled internal combustion engine and including an exhaust system;
    a generator driven by the engine for the generation of electrical power;
    an inlet communicating with an outlet and flow generating means for circulating a cooling air flow through and around the generator, the engine and the exhaust system; and
    a power management system sensing a load on the engine in order to distribute power according to actual demands for electrical power or heat in the mobile facilities.

27. A method according to claim 15, wherein the registration of the power demand includes registering a capacity of at least one battery, and wherein available power is regulated according to the demand for electrical and mechanical power.

28. A method according to claim 27, wherein the power management apparatus automatically starts and stops the engine according to present demands.

29. A power management system according to claim 16, wherein a present power load on the generation apparatus is sensed, and wherein power management according to the available power is determined according to a program containing a predetermined set of priorities.

* * * * *